Patented Feb. 26, 1952

2,587,572

UNITED STATES PATENT OFFICE 2,587,572

PROCESS FOR PRODUCTION OF AMINO HYDROXY COMPOUNDS BY HYDROGENATION OF NITRO HYDROXY COMPOUNDS

Philip F. Tryon, Terre Haute, Ind., assignor to Commercial Solvents Corporation, Terre Haute, Ind., a corporation of Maryland No Drawing. Application April 27, 1949, Serial No. 90,046

4 Claims. (Cl. 260—584)

My invention relates to a process for the production of amino hydroxy compounds by hydrogenation of nitro hydroxy compounds. More particularly it relates to an improved process for producing amino hydroxy compounds by continuous feeding of nitro hydroxy compounds to a hydrogenation vessel, as more particularly described hereinafter.

It is known that nitro hydroxy compounds can be hydrogenated to the corresponding amino hydroxy compounds under certain conditions. Johnson (U. S. Patent No. 2,157,386) described a method for preparing amino hydroxy compounds by the liquid phase hydrogenation of nitro hydroxy compounds, in the presence of a suitable hydrogenation catalyst. According to his process, the nitro hydroxy compound and catalyst, together with a solvent, are introduced into a suitable pressure hydrogenation apparatus and sealed. The reaction vessel is equipped with means for the introduction of hydrogen gas under pressure, and for heating and cooling. Agitation during hydrogenation is said to be desirable in order to insure thorough mixing of the nitro hydroxy compound, the hydrogen gas, and the catalyst. Hydrogen gas is introduced until the hydrogenation is complete, at which time the reaction mixture is removed from the apparatus and the desired amino compounds separated.

Johnson's process, while being the best and most efficient method for the hydrogenation of nitro hydroxy compounds prior to my invention, is subject to certain disadvantages. For example, the time required for complete hydrogenation is long, yields are not as high as desirable and catalyst life is usually short.

I have now discovered that much more efficient hydrogenation of nitro hydroxy compounds can be carried out if, instead of placing the entire charge to be hydrogenated into the reaction vessel, the nitro hydroxy compound is added to the reaction vessel at a relatively slow rate. More particularly, the nitro hydroxy compound is added only as fast as it can be hydrogenated, so that the concentration of nitro hydroxy compound present in the reaction vessel remains near zero.

In the prior art batch process, the yields were comparatively low, because the rise in pH brought about by the formation of the desired amino hydroxy compound caused the decomposition of a substantial quantity of the unreacted nitro hydroxy compound present in the vessel. At the beginning of the operation in the batch process the charge to the hydrogenation vessel consisting of catalysts, solvent and 2-nitro-2-methyl-1-propanol has a pH only slightly above 7.0. Then as the temperature and pressure are elevated, and hydrogen gas introduced, some of the nitro alcohol is reduced to amino alcohol, thus causing a rise in pH. As the pH rises, more and more of the as yet unreacted 2-nitro-2-methyl-1-propanol decomposes into 2-nitropropane and formaldehyde. The 2-nitropropane in turn is hydrogenated to 2-aminopropane. Furthermore, the desired 2-amino-2-methyl-1-propanol condenses with unreacted 2-nitro-2-methyl-1-propanol to give 2-(2'-nitroisobutyl)amino-2-methyl-1-propanol, which in turn is hydrogenated to 2-(2'-aminoisobutyl)amino-2-methyl-1-propanol. Thus it is seen that the yield of the desired 2-amino-2-methyl-1-propanol is cut down because of each of the above side reactions.

Since it is known that the above-described side reactions are accelerated by high pH, it would be expected that when a continuous feeding process is used the yield of the desired product would be just as low. The low yield would still be expected since the nitro hydroxy compound is exposed to the same conditions as in the batch process; namely, a rise in pH as more and more of the amino hydroxy compound is formed by the hydrogenation. However, contrary to that which would be expected, the yields are actually greatly increased by my new continuous feeding process, provided the nitro hydroxy compound is introduced only at a rate which will allow instantaneous hydrogenation.

By the use of my new improved process, yields of amino hydroxy compounds of 80-90% can be obtained in large scale hydrogenations as compared to yields of 40-50% obtained by the prior art batch process. Also, the time required to complete the hydrogenation of a given amount of nitro hydroxy compound is reduced by one-half in my new process. Two to three times as much nitro hydroxy compound can be hydrogenated in my new process with a given amount of catalyst as compared to the prior art process.

In the prior art process, the solvent remaining in the reaction vessel after hydrogenation is complete contains large quantities of low boiling amines. In order that the solvent may be used again, it is necessary that these amines be neutralized. When my new process is used, a much smaller quantity of sulfuric acid is required for neutralization of the low-boiling amines than in the prior art process. In one month, using the batch process in large-scale plant operations, 25,000 pounds of 2-amino-2-methyl-1-propanol were produced and 3,425 pounds of sulfuric acid were required to neutralize the low-boiling amines formed. With my new continuous feeding process, 37,000 pound of 2-amino-2-methyl-1-propanol were produced in one month, and only 2,285 pounds of sulfuric acid were required to neutralize the low-boiling amines.

According to my process, a solvent and suitable hydrogenation catalyst are placed in a reaction vessel of the same general type used in the prior art process. The temperature is then raised to 40–100° C. The pressure within the vessel is next adjusted to the range 200–2000 pounds per square inch, and the charge saturated with hydrogen gas. The nitro hydroxy compound to be hydrogenated is then pumped into the vessel at elevated pressures, at a slow, continuous rate. Additional hydrogen gas is added as required to maintain the desired reaction pressure. The rate of introduction of the nitro hydroxy compound is adjusted so that hydrogenation is completed as it enters and the rate of introduction is reduced if at any time the concentration of the nitro hydroxy compound rises substantially above zero.

The hydrogenation apparatus used may be any suitable type which comprises a high pressure reaction vessel equipped with means for introducing the nitro hydroxy compound and hydrogen gas under pressures within the range 200–2000 pounds per square inch. In order to insure thorough mixing of the nitro hydroxy compound, the hydrogen gas, and the catalyst, suitable means should be provided whereby the reactants may be kept in motion, as for example by means of stirrers or other suitable devices, or by maintaining the vessel in motion. The reaction vessel is preferably provided with suitable means for heating or cooling the reaction mixture in order that the hydrogenation may be carried out at the desired temperature.

Due to the fact that certain of the nitro hydroxy compounds are solid, it is usually necessary to add an inert solvent to the reaction vessel along with the catalyst in order to insure better contact between the nitro hydroxy compound, the hydrogen gas, and the catalyst. Any suitable solvent or solvent mixture may be used in my process which is chemically inert towards the catalyst and the components of the reaction mixture at the temperature and pressure employed. I prefer to use water or one of the lower aliphatic alcohols. Either anhydrous or aqueous, methyl or ethyl alcohol is a very desirable solvent. The exact nature of the solvent which will secure maximum results will, of course, depend to some extent upon the reaction conditions employed. The relative proportions of solvent to be added, to a given quantity of the nitro hydroxy compound to be hydrogenated, will also depend to some extent upon the particular materials involved and the other reaction conditions. In any particular case preliminary experiments will readily demonstrate the optimum amount of solvent to be used.

I have found, in general, that any suitable hydrogenation catalyst that is active at the desired operative conditions may be used in my process. I prefer to use a finely divided nickel catalyst such as Raney nickel, which is prepared as follows: A nickel-aluminum alloy is prepared in finely divided form. The aluminum is dissolved out of this powdered alloy by strong alkali solution. The nickel residue is washed free from alkali and salts with water and kept under liquid. I have found that numerous other hydrogenation catalysts also give excellent results. Platinum and palladium hydrogenation catalysts are particularly adaptable for use in my new process.

The pressure and temperature relationships may be varied for the hydrogenation, depending upon the particular nitro hydroxy compound being hydrogenated and the catalyst that is used in my process. Any pressure within the range of about 200–2000 pounds per square inch may be used. In general, higher pressures require less time for complete hydrogenation to occur, therefore, the rate of feed can be increased as the pressure is increased. The reaction temperature should preferably be maintained within the range of about 40–100° C. In general, high temperatures promote rapid hydrogenations, but if temperatures above 100° C. are used there is a tendency for decomposition to take place. Excellent yields of amino hydroxy compounds are obtained in a minimum of time when temperatures around 70° C. are used.

The nitro hydroxy compounds which may be hydrogenated by my new continuous feeding process constitute the nitro hydroxy paraffins and the aryl or cycloalkyl substituted nitro hydroxy paraffins, with the nitro and hydroxy groups on adjacent carbon atoms. Among the nitro hydroxy paraffins suitable for use in my process are the nitro alcohols such as 2-nitro-2-methyl-1-propanol, 2-nitro-1-butanol, 2-nitro-1-pentanol, 2-nitro-1-hexanol, 3-nitro-4-heptanol, and 5-nitro-4-octanol, nitro glycols such as 2-methyl-2-nitro-1,3-propanediol, 2-ethyl-2-nitro-1,3-propanediol, 2-isopropyl-2-nitro-1,3-propanediol, tris(hydroxymethyl)-nitromethane and 2,5-dinitro-2,5-bishydroxymethyl-3,4-diphenyl-1,6-hexanediol.

The following specific examples will further illustrate my invention:

EXAMPLE I

A charge containing 15 grams of nickel catalyst, prepared as described above, and enough water to give a catalyst volume of 45 ml., and 423 ml. of methanol, was introduced into an Adkins' type hydrogenation apparatus equipped with flexible tubing for the introduction of hydrogen gas and nitro hydroxy compound under pressure. The bomb was closed and the temperature raised to 70° C. The pressure was then raised to 500 lbs. per square inch by the introduction of hydrogen gas under pressure. 2-nitro-2-methyl-1-propanol, in about 70% aqueous solution, was next pumped into the vessel, by the use of a Milton Roy pump, at a rate of about 60 ml. per hour. A total of 202 ml. of 2-nitro-2-methyl-1-propanol was introduced over a period of two and one-half hours. Each time the pressure dropped to 450 pounds per square inch, hydrogen gas was again introduced to raise the pressure to 500 pounds per square inch. In the following table, complete records of the experiment are given. The time shown is in minutes, measured from the starting time designated as zero. A conversion of 95.8%, based on 2-nitro-2-methyl-1-propanol, was obtained in this run.

Table I
CONTINUOUS FEED PROCESS

| Elapsed Time | Temp. | Pressure | Pressure Raised To— | Increments of 70% Aqueous 2-Nitro-2-methyl-1-propanol |
|---|---|---|---|---|
| Min. | °C. | P.s.i. | P.s.i. | Ml. |
| 0 | 68 | 500 | | Pump started. |
| 4 | 68 | 500 | | |
| 15 | 74 | 450 | 500 | 12. |
| 21 | 69 | 450 | 500 | 6. |
| 29 | 69 | 450 | 500 | 11. |
| 38 | 69 | 450 | 500 | 11 (Pump off). |
| 47 | 69 | 450 | 500 | 0 (Pump on). |
| 56 | 69 | 450 | 500 | 15. |
| 61 | 69 | 450 | 500 | 9. |
| 65 | 69 | 450 | 500 | 6. |
| 70 | 69 | 450 | 500 | 6. |
| 75 | 69 | 450 | 500 | 4. |
| 80 | 69 | 450 | 500 | 15. |
| 85 | 69 | 450 | 500 | 10. |
| 90 | 69 | 450 | 500 | 10 (Pump off). |
| 95 | 69 | 450 | 500 | 0 (Pump on). |
| 100 | 69 | 450 | 500 | 5. |
| 106 | 69 | 450 | 500 | 15. |
| 112 | 69 | 450 | 500 | 12. |
| 119 | 69 | 450 | 500 | 11. |
| 123 | 69 | 450 | 500 | 7. |
| 128 | 69 | 450 | 500 | 10 (Pump off). |
| 131 | 69 | 450 | 500 | 0. |
| 138 | 69 | 450 | 500 | 0 (Pump on). |
| 143 | 69 | 450 | 500 | 15. |
| 147 | 69 | 450 | 500 | 7. |
| 152 | 69 | 450 | 500 | 5 (Pump off). |
| 210 | 69 | 500 | | 0. |

EXAMPLE II

A series of hydrogenations of 2-nitro-2-methyl-1-propanol was carried out substantially as described in Example I, except that the temperature of reaction was varied in two of the runs and the amount of 2-nitro-2-methyl-1-propanol was increased in two runs. The temperatures, amounts of 2-nitro-2-methyl-1-propanol and per cent conversion are shown in Table II below.

Another series of hydrogenations of 2-nitro-2-methyl-1-propanol was carried out using the batch process. In each of these runs, the original charge to the hydrogenation vessel contained 15 grams of nickel catalyst and enough water to give a catalyst volume of 45 ml., 423 ml. of methanol and 202 ml. of 70% aqueous 2-nitro-2-methyl-1-propanol. The vessel was then sealed and the temperature raised to the reaction temperature used, as shown in Table III below. Hydrogen gas was then introduced into the vessel until a pressure of 500 pounds per square inch was indicated. At 15 minute intervals throughout the hydrogenation, additional hydrogen gas was added to raise the pressure to 500 pounds per square inch. This addition of hydrogen gas was repeated until hydrogen absorption had ceased. Results of this series are shown in Table III below.

Table II
CONTINUOUS FEED PROCESS

| Aqueous 2-Nitro-2-methyl-1-propanol | Temperature | Conversion |
|---|---|---|
| Ml. | °C. | Per cent |
| 202 | 45 | 96.0 |
| 808 | 45 | 87.3 |
| 202 | 70 | 95.8 |
| 404 | 70 | 95.6 |

Table III
BATCH PROCESS

| Aqueous 2-Nitro-2-methyl-1-propanol | Temperature | Conversion |
|---|---|---|
| Ml. | °C. | Per cent |
| 202 | 30 | 66.7 |
| 202 | 45 | 59.2 |
| 202 | 55 | 55.2 |
| 202 | 65 | 47.6 |

In large scale plant operations, average yields of 2-amino-2-methyl-1,3-propanediol have been about 69% when using my new continuous feeding process for the catalytic reduction of 2-nitro-2-methyl-1,3-propanediol. Prior to my invention, the best yields of 2-amino-2-methyl-1,3-propanediol obtained by the prior art batch process was about 55%.

What I claims is:

1. A modified batch process of hydrogenating nitro hydroxy paraffin compounds, which have their nitro and hydroxy groups on adjacent carbon atoms, to the corresponding amino hydroxy compounds, which comprises introducing a batch of inert solvent for the nitro hydroxy compound and a hydrogenation catalyst into a closed reaction zone, heating the zone to a temperature of from about 40° to 100° C. and passing hydrogen into the zone until the pressure is within the range of from about 200 to 2000 pounds per square inch, then introducing the nitro hydroxy compound to be hydrogenated into said zone and maintaining the concentration of said nitro hydroxy compound in said zone substantially at zero by feeding it so slowly that hydrogenation is completed substantially instantaneously as it enters the reaction zone, while maintaining said conditions of temperature and hydrogen pressure, and recovering the resulting amino hydroxy compound from the resulting batch.

2. The process of claim 1 wherein the catalyst in the reaction zone is a nickel hydrogenation catalyst.

3. The process of claim 1 wherein the nitro hydroxy compound is introduced into said reaction zone dissolved in an inert solvent.

4. A modified batch process of hydrogenating 2-nitro-2-methyl-1-propanol which comprises introducing a batch of inert solvent for the 2-nitro-2-methyl-1-propanol and a hydrogenation catalyst into a closed reaction zone, heating the zone to a temperature of from about 40° to 100° C. and passing hydrogen into the zone until the pressure is within the range of from about 200 to 2000 pounds per square inch, then introducing 2-nitro-2-methyl-1-propanol into said zone and maintaining its concentration in said zone substantially at zero by feeding it so slowly that it reacts substantially instantaneously as it enters said zone, while maintaining said conditions of temperature and hydrogen pressure, and recovering the resulting 2-amino-2-methyl-1-propanol from the resulting batch.

PHILIP F. TRYON.

REFERENCES CITED

The following references are of record in the file of this patent:

UNITED STATES PATENTS

| Number | Name | Date |
|---|---|---|
| 2,132,389 | Bertsch | Oct. 11, 1938 |
| 2,139,122 | Hass et al. | Dec. 6, 1938 |
| 2,139,123 | Hass et al. | Dec. 6, 1938 |
| 2,139,124 | Hass et al. | Dec. 6, 1938 |
| 2,157,386 | Johnson | May 9, 1939 |
| 2,157,391 | Vanderbilt | May 9, 1939 |
| 2,174,242 | Hass et al. | Sept. 26, 1939 |
| 2,347,621 | Tindall | Apr. 25, 1944 |
| 2,413,153 | O'Loughlin | Dec. 24, 1946 |

OTHER REFERENCES

Groggins: "Aniline and its Derivatives" (D. Van Nostrand Co., N. Y., 1924), page 21.

Johnson et al.: "J. Org. Chem., vol. 8, pp. 7–9 (1943).